Aug. 27, 1968  P. BREIDT, JR., ET AL  3,399,105
UNFOLDABLE THERMOPLASTIC SHEET
Filed Oct. 5, 1967  2 Sheets-Sheet 1

INVENTORS.
Peter Breidt, Jr.
Lloyd E. Lefevre
BY
Robert B. Ingraham
AGENT

Aug. 27, 1968  P. BREIDT, JR., ET AL  3,399,105

UNFOLDABLE THERMOPLASTIC SHEET

Filed Oct. 5, 1967  2 Sheets-Sheet 2

INVENTORS.
Peter Breidt, Jr.
BY Lloyd E. Lefevre

Robert B. Ingraham
AGENT

United States Patent Office 3,399,105
Patented Aug. 27, 1968

3,399,105
UNFOLDABLE THERMOPLASTIC SHEET
Peter Breidt, Jr., Midland, and Lloyd E. Lefevre, Bay City, Mich., assignors to The Dow Chemical Company, Midland, Mich., a corporation of Delaware
Continuation-in-part of application Ser. No. 571,657, Mar. 24, 1966. This application Oct. 5, 1967, Ser. No. 675,274
3 Claims. (Cl. 161—102)

ABSTRACT OF THE DISCLOSURE

A foliated plastic sheet of thermoplastic resinous material is disclosed wherein the foliated sheet may be subsequently unfolded to provide a sheet having a width much greater than the die from which it was extruded.

---

This application is a continuation-in-part of our co-pending application Ser. No. 571,657, filed Mar. 24, 1966, now abandoned, which in turn is a divisional application of our co-pending application Ser. No. 403,713 filed Oct. 14, 1964.

This invention relates to an extruded wide thermoplastic resinous sheet, and more particularly relates to an improved extruded sheet which may be unfolded to form a wide sheet.

For many applications, wide thermoplastic resinous sheet is desired. It is obtained by one of two methods. One method is by extruding such material in equipment having a die sufficiently large to generate a sheet of the desired width and a second method is the extrusion of a tube and stretching of the tube by means of internal gas pressure by the well known bubble process and subsequently slitting the tube to provide a sheet having a width equal to the circumference of the tube. Generally equipment for the preparation of such wide sheets is very expensive, complicated, and occupies much space.

It is an object of this invention to provide a wide thermoplastic resinous sheet which is readily placed on a roll which is much narrower than the sheet itself.

Another object of this invention is to provide a unique laminated sheet which is readily unfolded to provide a sheet which has a width which is about an integral multiple of the extruded sheet.

Sheet in accordance with the present invention is prepared by extruding a first stream of thermoplastic resinous material, the first stream having a first edge and a second edge, simultaneously extruding at least one, and beneficially a plurality of, minor streams within the first stream, each of the minor streams having a sheet-like configuration and being interdigitated with each other and alternatingly extending within the first stream from the first edge to a position adjacent the second edge and from the second edge to a position adjacent the first edge, the combined streams being formed into a generally sheet-like configuration and subsequently cooling below the thermoplastic temperature, the thermoplastic resinous material of the first stream being flexible and on cooling does not adhere strongly to the material of the minor streams.

The sheet of the present invention is particularly adapted to be prepared by apparatus which comprises an extrusion die comprising a housing, the housing having a first or main passageway so constructed and arranged as to permit streamline flow therein, the housing defining a first polymer entrance and an oppositely disposed slot-like extrusion orifice, means disposed within the passageway defining a plurality of generally parallel slot-like extrusion orifices, each extrusion orifice adapted to deliver a sheet-like stream of material into a material flowing within the first passageway, the extrusion orifices alternately extending from opposite walls of the passageway for a distance somewhat less than the total width of the passageway and the orifices being in interdigitating relationship.

The sheet in accordance with the present invention comprises a flexible thermoplastic resinous sheet having length, width and thickness, the width being substantially greater than the thickness, the length being substantially greater than the width, the sheet having oppositely disposed generally parallel first and second external side edges, the sheet having disposed therein at least one, and beneficially a plurality of poorly adhering lamina, the lamina extending from the first edge toward the second edge and terminating short thereof, remaining lamina extending from the second edge toward the first edge and terminating short thereof, the lamina extending the length of the sheet and being in generally parallel spaced apart relationship and being interdigitated with each other, the materials of the lamina and the sheet being selected so that the adhesion between the sheet and the lamina is sufficiently low that sheet may be unfolded to form a sheet wider than the initial width of the sheet.

Further features and advantages of the present invention will become more apparent from the following specification when taken in connection with the drawing wherein:

FIGURE 1 schematically depicts the external configuration of an apparatus for the preparation of sheet in accordance with the invention.

Figure 1:
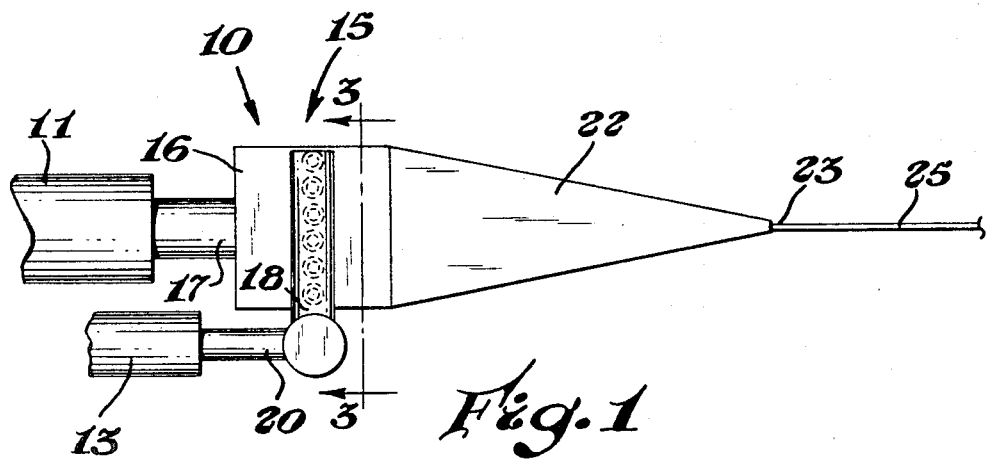

In FIGURE 1 there is schematically illustrated a view of apparatus generally designated by the reference numeral 10. The apparatus 10 comprises in cooperative combination a first extruder 11, a second extruder 13, and a die assembly 15. The die assembly 15 comprises a housing 16, a conduit 17 adapted to receive heat plastified thermoplastic resinous material from the extruder 11 and transfer it to the body 16, a distribution manifold 18, a conduit 20 adapted to receive material from the extruder 13 and deliver it to the manifold 18. The housing 16 has a transition section 22 which terminates in an extrusion slot 23 from which issues an elongate sheet 25. The internal configuration of the housing 16 and transition section 22 is such that streamline flow is permitted within.

Figure 2:
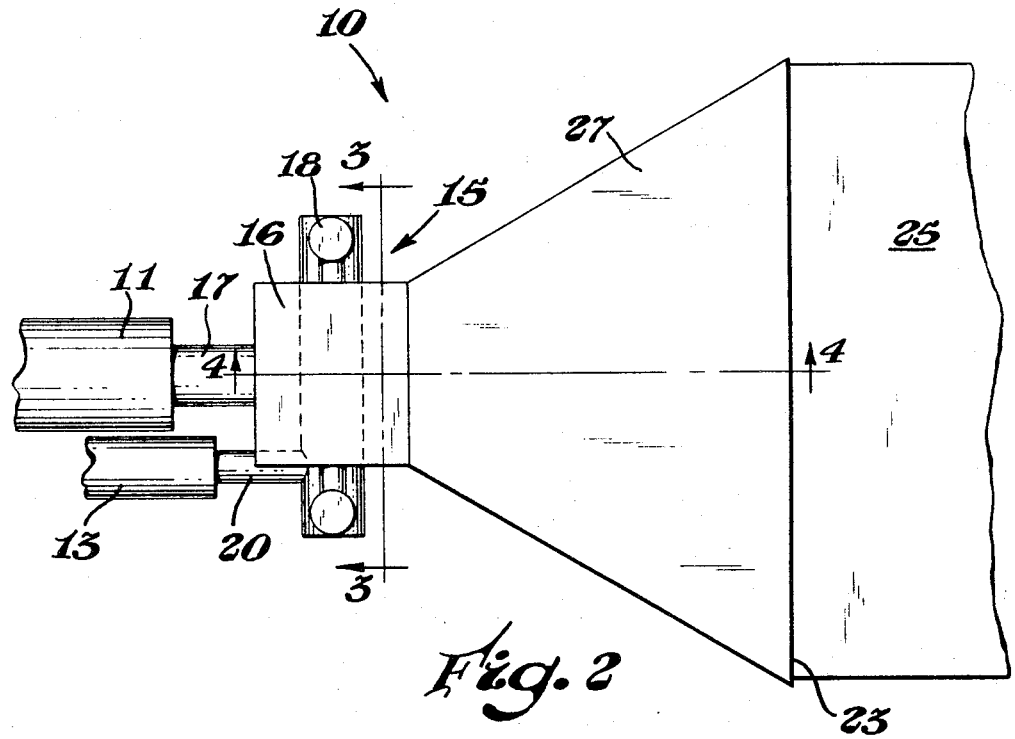
FIGURES 2, 3 and 4 are views of the apparatus of FIGURE 1.
Figure 3:
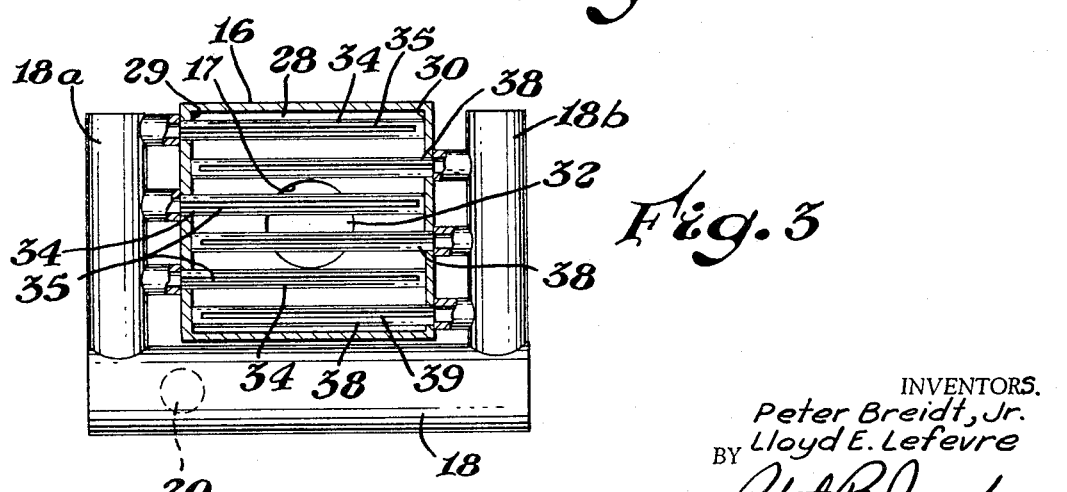

FIGURE 3 is a sectional view of the housing 16 taken along the line 3—3 of FIGURES 1 and 2. The housing 16 defines an internal major passageway 28 having oppositely disposed sides or edges 29 and 30. The passageway 28 is so constructed and arranged so as to permit substantially streamline flow therein. The conduit 17 defines a passageway 32 which is in operative communication with the extruder 11 (not shown). A plurality of housings 34 each defining an extrusion orifice 35 are disposed within the passageway 28. The housings 34 are in communication with a leg 18a of the distribution manifold 18. Extrusion orifices 35 extend from the wall 29 and terminate adjacent the wall 30, thus providing an orifice or slot extending from one wall to a location close to the opposite wall. A plurality of housings 38 are interdigitated with the housings 34. Each of the housings 38 defines an extrusion orifice or slot 39. The slots 39 extend from the wall 30 to a position generally adjacent and spaced from the wall 29. Thus, the slots 35 and 39 alternately extend from the opposite walls in an interdigitated manner.

Figure 4:
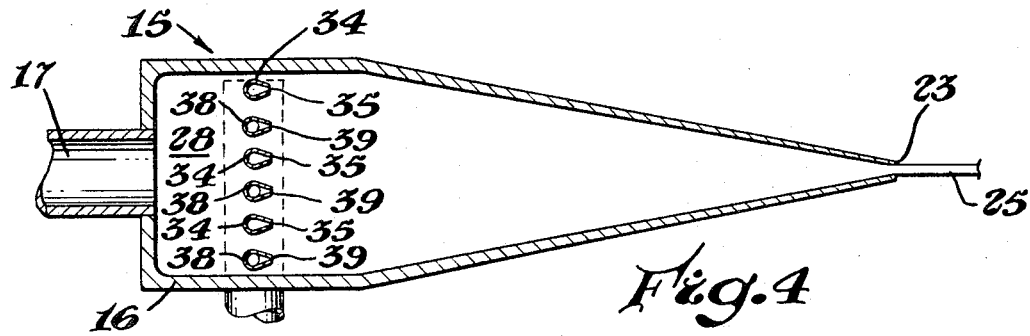

FIGURE 4 is a view of the apparatus of FIGURES 1 and 2 taken along the line 4—4 of FIGURE 2 illustrating the generally parallel arrangements of the housings 34 and 38 within the passageway 28. Thermoplastic resinous material passing into the passage 28 from the conduit 17 flows about the housings 34 and 35. Material forced into the housings 34 and 35 is distributed within the stream in the passageway 28 in a manner as is illustrated by the end view configuration of the resultant sheet shown in exaggerated form in FIGURE 5.

Figure 5:
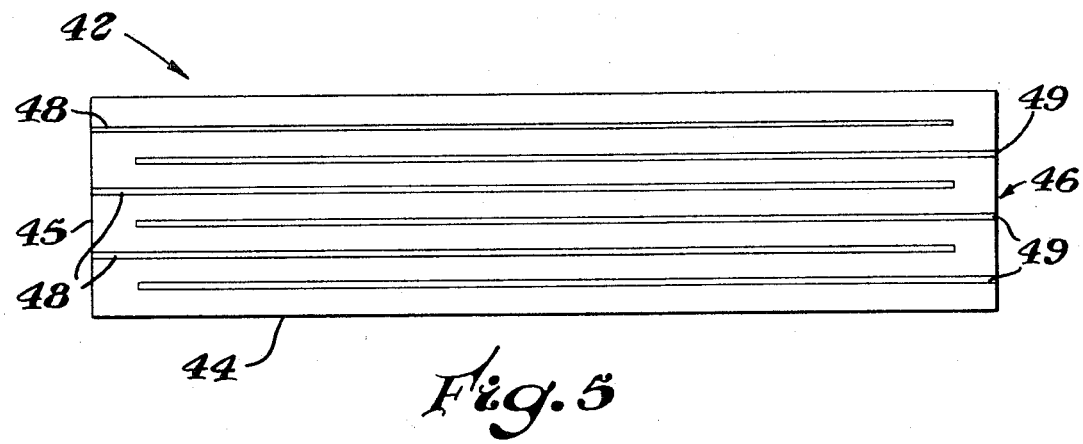
FIGURE 5 is a schematic representation of a laminated sheet produced by the apparatus of FIGURES 1-4.

The schematic representation of FIGURE 5 depicts an end view of a linear elongate sheet designated by the reference numeral 42. The sheet 42 comprises a flexible thermoplastic resinous body 44 having a first external side edge 45 and a second external side edge 46. Within the body 44 are a plurality of lamina 48 and a plurality of lamina 49. The lamina 48 extend from the edge 45 toward the edge 46 in generally parallel relationship, whereas the lamina 49 extend from the edge 46 toward the edge 45. The lamina 48 and 49 are generally parallel and are in interdigitated relationship and terminate short of the edges they extend toward. The lamina 48 and 49 are of a diverse material which is poorly adhered to the flexible thermoplastic resinous material 44. When the ends of the sheet 42 extend perpendicular to the edges, a major face of the sheet has a generally rectangular configuration.

Figure 6:
FIGURE 6 depicts an unfolded wide thermoplastic resinous flexible sheet prepared by the present invention.

FIGURE 6 is a sectional view of a wide sheet of thermoplastic resinous material prepared from the sheet 42 wherein a portion of the edge 45 designated at 45a has been separated from the adjacent lamina 48 and the entire body 44 stretched out to its maximum width.

Employing an apparatus substantially as illustrated in FIGURES 1, 2, 3, 4 and 5, high pressure polyethylene having a melt index of 10 is co-extruded with polystyrene. A 10 percent by weight solution of the polystyrene has a viscosity of about 20 centipoises at 25° C. The polyethylene is employed as the continuous phase, whereas the polystyrene is the interdigitated discontinuous phase. The resultant sheet is 28 inches in width and has a total thickness of 34 mils. The polyethylene layers have a thickness of 4 mils, and the polystyrene layers a thickness of about 1 mil. On cooling of the sheet to room temperature, the polyethylene and polystyrene layers are readily separated to form a sheet substantially as illustrated in FIGURE 6, having a thickness of about 4 mils, and a width of about 194½ inches. Repeating the previous procedure with the exception that a plasticized polyvinyl chloride is employed to replace the polyethylene, a wide polyvinyl chloride sheet is obtained, having a width of about 194½ inches, a thickness of 4 mils. Similar results are obtained when the polystyrene of the foregoing illustrations is replaced with polymethyl methacrylate or ethyl cellulose.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive of otherwise limiting of the present invention, excepting as it is set forth and defined in the hereto-appended claims.

What is claimed is:
1. A flexible thermoplastic resinous sheet having length, width and thickness, the width being substantially greater than the thickness, the length being substantially greater than the width, the sheet having oppositely disposed generally parallel,
   first and
   second side edges,
   a plurality of poorly adhering thermoplastic resinous lamina disposed within said sheet and coextensive with the length thereof,
   alternating lamina extending from the first side edge toward the second side edge and terminating short thereof,
   the remaining lamina extending from the second side edge toward the first side edge and terminating short thereof, the lamina being in generally parallel spaced apart interdigitated relationship with each other, the materials of the lamina and the sheet being selected so that the adhesion between the sheet and the lamina is sufficiently low that the sheet may be unfolded to form a sheet wider than the initial width of the sheet.

2. The sheet of claim 1 wherein the sheet comprises polyethylene and the lamina polystyrene.

3. A flexible thermoplastic resinous sheet having length, width and thickness, the width being substantially greater than the thickness, the length being substantially greater than the width, the sheet having oppositely disposed
   first and
   second external side edges and first and second ends, the side edges extending substantially the entire length of the sheet in generally parallel spaced apart relationship, the edges terminating at the first and second ends,
   at least one poorly adhering thermoplastic resinous lamina disposed within the sheet and coextensive with the length thereof and generally coextensive with the width thereof, the lamina extending from the first side edge toward the second side edge and terminating short thereof, the materials of the lamina and the sheet being selected so that the adhesion between the sheet and the lamina is sufficiently low that the sheet may be unfolded to form an unfolded sheet having an unfolded width which is about an integral multiple of the initial width of the sheet.

References Cited

UNITED STATES PATENTS 3,140,327  7/1964  Dettmer _____ 264—119
3,274,646  9/1966  Krystoff _____ 18—13

FOREIGN PATENTS 760,611  11/1956  Great Britain.

ROBERT F. BURNETT, *Primary Examiner.*

R. H. CRISS, *Assistant Examiner.*